April 2, 1963 W. E. STAGEBERG 3,083,802
MECHANICAL COUPLING
Filed April 8, 1960 2 Sheets-Sheet 1
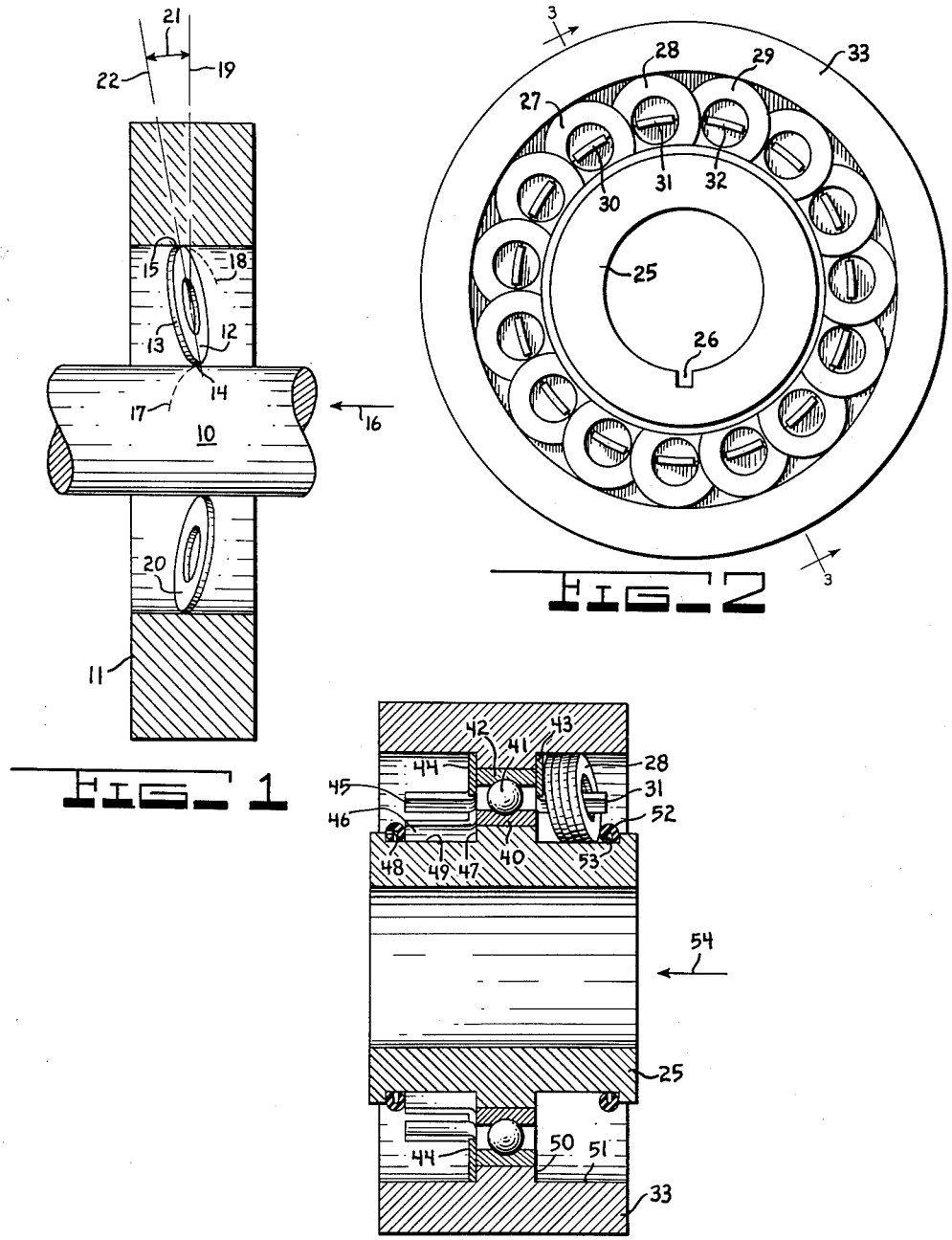
INVENTOR.
WILFRED E. STAGEBERG
BY
Lockwood, Woodard, Smith & Weikart
ATTORNEYS April 2, 1963 W. E. STAGEBERG 3,083,802
MECHANICAL COUPLING
Filed April 8, 1960 2 Sheets-Sheet 2
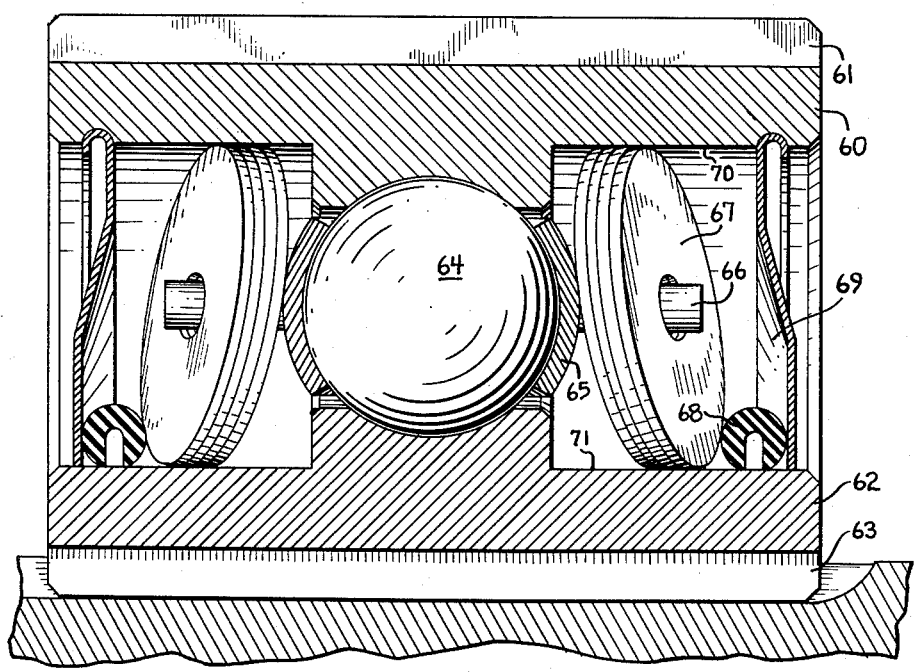
FIG_6
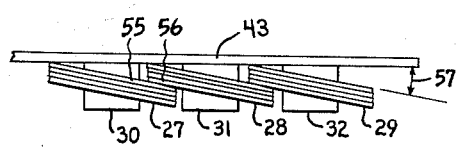
FIG_4
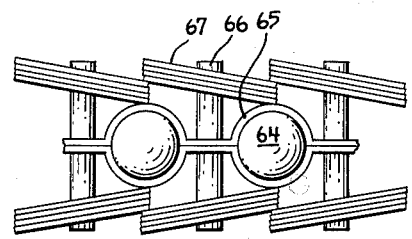
FIG_7
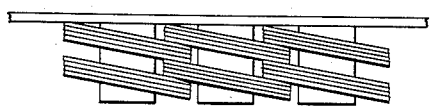
FIG_5
INVENTOR.
WILFRED E. STAGEBERG
BY
Lockwood, Woodard, Smith & Weikart
ATTORNEYS United States Patent Office 3,083,802
Patented Apr. 2, 1963

3,083,802
MECHANICAL COUPLING
Wilfred E. Stageberg, Terre Haute, Ind., assignor, by direct and mesne assignments, to Link-Belt Company, a corporation of Illinois
Filed Apr. 8, 1960, Ser. No. 20,850
12 Claims. (Cl. 192—45.1)

This invention relates generally to mechanical power couplings, and more particularly to overrunning or one-way clutches.

In the mechanical power transmission art there is a need for an overrunning clutch device which operates properly in an environment which subjects it to unusual combinations of inertial and centrifugal forces. Such an environment exists, for example, in a planetary transmission where overrunning clutches are needed in the planet gear locations. Moreover, there is a need for overrunning clutches having great durability though constructed of materials and by methods involving minimal costs.

The present invention employs a first and second member rotatably and coaxially related to each other. The first member may be the driving member and the second a driven member or vice versa. The driving member has an outer cylindrical clutch surface with its axis of revolution being the axis of the member. The driven member has an inner cylindrical clutch surface with its axis of revolution being the axis of the member. The diameter of the inner surface of the driven member is somewhat greater than that of the outer surface of the driver so that an annular space is provided between the opposed cylindrical surfaces. Washer like clutching members having a diameter slightly greater than the radial dimension of the annular space between the driving member and the driven member are disposed about the axis of the inner member with their outside diameters engaging the outer and inner cylindrical clutch surfaces of the driving and driven members respectively. Each washer is disposed and constrained in a relationship with the driving and driven members such that relative movement rotationally between the driving and driven members in one direction induces the washers to float relatively in contact with the surfaces whereas attempted relative movement in the opposite direction causes the washers to jam between the cylindrical surfaces of the two members permitting transmission of power therebetween. Either the inner or outer member may be used as the driving member.

It is a general object of this invention to provide a novel mechanical coupling.

It is another object of the present invention to provide an overrunning clutch insensitive to inertia, momentum or centrifugal forces existing thereon.

It is another object of this invention to provide an overrunning clutch having low friction during the overrunning phase of operation.

It is another object to provide an overrunning clutch readily engageable and disengageable at high speeds.

It is another object of this invention to provide an overrunning clutch operable at a high frequency of engagement and disengagement.

It is another object of this invention to provide an overrunning clutch having uniform force distribution therein.

It is another object to provide an overrunning clutch having exceptional shock resistance.

It is another object of this invention to provide an overrunning clutch having characteristics of uniform distribution of wear.

It is another object of this invention to provide an overrunning clutch susceptible to minimal galling action.

It is another object of this invention to produce an overrunning clutch having excellent static and dynamic balance characteristics.

It is another object of this invention to provide an overrunning clutch which can be produced by simple and conventional manufacturing methods and processes.

It is another object of this invention to produce an overrunning clutch adapted to a variety of applications.

It is another object of this invention to produce an overrunning clutch adapted to manufacture from a variety of materials and substitute materials.

It is another object of this invention to provide a coupling capable of delivering greater torque in one rotational direction than in another.

Other objects, advantages and uses of this invention will become apparent to the reader when the description of the invention is read and studied with reference to the accompanying figures wherein the same parts are identified by the same reference characters, and in which:

FIG. 1 shows a schematic diagram to illustrate the principle of my invention;
FIG. 2 shows a typical embodiment of the invention;
FIG. 3 shows a cross section of the embodiment of FIG. 2;
FIG. 4 shows schematically the relationship of clutching members of the embodiment of FIG. 2;
FIG. 5 shows schematically another arrangement of clutching members useful in high torque applications;
FIG. 6 shows another embodiment of my invention in a ball bearing; and
FIG. 7 shows a portion of the embodiment of FIG. 6.

Referring to FIG. 1, which illustrates the principle of operation of this invention, there is shown a round shaft 10, which for this example will be designated the driving member or driver. Encircling shaft 10 is a cylindrical ring 11 which is shown in cross section in FIG. 1. The ring is coaxial with the shaft and for this example is the driven member. A washer-like clutching member 12 having a diameter greater than the radial clearance between the shaft and the ring is shown disposed between the shaft and ring in a tilted position. The peripheral surface 13 of the clutching member 12 is in contact with the outside diameter of the shaft at location 14 and with the inside diameter of the ring at location 15.

Assume that the relative positions between the shaft and ring in the direction of their axes are maintained by some means and also that they are maintained coaxial by some means. Upon starting to turn the shaft in a clockwise direction when viewed in the direction shown by arrow 16, the clutching member will tend to roll with respect to the shaft along a path designated by dotted line 17. It will tend to roll with respect to the ring along a path designated by dotted line 18 on its inside surface. Accordingly, the tendency of the clutching member is to assume an erect position where its peripheral surface contacts the shaft and the ring in a plane perpendicular to the axes of the ring and shaft. Line 19 of FIG. 1 would be in this plane. Because the diameter of the clutching member is greater than the radial clearance between the outside surface of the shaft and the inside surface of the ring, the clutching member cannot assume the position it seeks but instead becomes jammed between the shaft and the ring. Consequently there can be no rotational movement of the shaft in a clockwise direction with respect to the ring and the clutch is engaged for power transmission.

If the shaft is turned in a counterclockwise direction with respect to the ring, the clutching member tends to roll on the shaft and ring in senses opposed to the dotted lines 17 and 18 respectively and accordingly to reach a position where its peripheral surface does not touch either the shaft or ring. It is apparent that the clutch would be disengaged in this condition, and further, that the clutching member would fall out of the assembly if it were not restrained by some means. The means for restraining the clutching member and for maintaining the axial and radial alignment or position of the shaft and ring will become apparent as the description proceeds. It should be noted at this point that a number of clutching members such as member 12 in FIG. 1, can be disposed about the shaft in the space between the shaft and ring. Their attitude with respect to the shaft and ring must be the same so that all clutching members act in a complementary fashion to produce the overrunning clutch effect. One such companion clutching member 20 is shown in FIG. 1.

The angle 21 between line 19 and the line 22 passing through contact locations 14 and 15 is called the angle of engagement.

Referring now to FIG. 2, there is shown a side view of an exemplary embodiment of the invention in which inner member 25 has a keyway 26 therein whereby it can be keyed to a driving or driven shaft. Inner member 25 shall be hereinafter called the driver for purposes of explanation though in actual practice of the invention it can function as a driven member. A number of packs such as packs 27, 28 and 29 of clutching members are disposed about the driver 25 and the clutch packs are maintained in their proper relative positions by the arms 30, 31 and 32 of a spacer. Driven member 33 is mounted coaxially with driver 25 by means not shown in this figure.

In FIG. 3 there is shown a section through the embodiment of FIG. 2 viewed in the direction of the arrows shown thereon. Driven member 33 is mounted to driver 25 by means of a ball bearing assembly having an inner race 40, bearing balls 41 and outer race 42. The bearing provides axial and radial alignment between the driven member 33 and driver 25.

Only one pack 28 of four clutching members is shown in FIG. 3. Arm 31 of spacer 43 passes through the open center of the clutching members of pack 28. In the interest of clarity of drawing, the remaining portion of spacer 43 is not shown. However, an identical spacer 44, having a number of arms like 45 and 46 is shown on the opposite side of bearing race 42.

The driver 25 has a groove in it defined by walls 47, 48 and the external cylindrical driving clutch surface or race 49. The driven member 33 has a wall 50 providing an abutment for spacer 43. The spacer is confined radially by the internal cylindrical driven clutch surface or race 51. A resilient member such as an O ring 52 girdles the surface 49 of the driver 25. The O ring abuts wall 48 of the driver and presses against the outermost clutching member of pack 28 to keep the pack in place against the spacer 43 and the next succeeding pack 29 (FIG. 2). The O ring has an internal circumferential groove 53 cut therein to improve its resilient characteristic.

FIG. 4 shows schematically the arrangement of clutch packs 27, 28 and 29 of FIG. 2. It should be noted that each pack contains four separate clutching members and that the innermost member of one pack is in sliding engagement with the outermost member of the next succeeding pack. For example, member 55 is in sliding engagement with member 56. In FIG. 2 this is apparent in the vicinity of the section line. Referring again to FIG. 4, there is shown an angle designated by reference character 57. This angle is representative of the rate of engagement of the clutch. It is apparent that the rate of engagement may be increased by using a greater number of clutching members in each pack, or by increasing their thickness.

With the principle of operation in mind as explained with reference to FIG. 1, it will be clear that where the angle 57 of FIG. 4 is greater, attempted rotation of the driver with respect to the driven member in the driving or locking rotational direction, causes the clutching members to attempt to follow paths on the cylindrical surfaces of the driver and driven member which if extended would take the form of a "faster spiral." The result is a greater rate of engagement of the clutch.

Where greater torque capacity of the clutch is required, the packs of clutching members can be stacked as shown schematically in FIG. 5 where there are two adjacent rows of clutch packs.

The principle of operation explained with reference to FIG. 1, requires that initially, at least one of the clutching members be in contact with both the inner cylindrical surface 51 of the driven member of FIG. 3 and with the outer cylindrical surface 49 of the driver 25. This contact is maintained by the O ring 52 which urges the clutching members into contact with these surfaces. It should be noted that when the clutch is in its overrunning condition, that is when the relative rotation of the driver 25 to the driven member 33 is counterclockwise when viewed in the direction of arrow 54 of FIG. 3, the clutching members are engaged in light rolling contact with surfaces 49 and 51. Accordingly, sliding friction between the clutching members and these surfaces is present only to the extent necessitated by the fact that the members are maintained in an angled position as shown in the various figures of drawing, and the fact that the circumference of the clutch surface 49 is less than that of the clutch surface 51.

FIG. 6 shows in cross section an embodiment of the present invention incorporated in a ball bearing assembly wherein outer race 60 has an external spline 61 thereon. Similarly inner race 62 has an internal spline 63 thereon. Bearing balls 64 are appropriately spaced in conventional fashion by bearing cage 65. Pins 66 fastened to the bearing cage 65 provide the spacing arms for clutch pack 67 of four clutching members. Grooved O ring 68, which is confined by grease or dirt shield 69, urges the outermost members of the clutch packs inwardly to cause the outside diametral surfaces of the clutching members to lightly engage the internal cylindrical clutching surface 70 of outer race 60 and the external cylindrical clutching surface 71 of the inner race 62.

FIG. 7 shows schematically a portion of the embodiment of FIG. 6 to illustrate a typical placement of the clutch pack spacing pins 66.

While the foregoing description has referred to certain members as drivers and driven members it should, of course, be understood that they can be employed inversely, i.e. with the driven member as the driver and the driver as the driven member. It should also be understood that though many packs of clutching members are normally employed, the number of packs can be varied as well as the number of individual clutching members in a pack. Actually one clutching member is sufficient to produce overrunning clutch operation. The clutching members normally are made of thin, spring steel washers. They can be made more or less yielding diametrically by selection of their inside diameter in relation to their outside diameter. This feature is useful to afford some control of shock of clutch engagement.

Though the embodiments described have shown a ball type bearing with a row of clutching member groups symmetrically disposed on each side thereof, it may sometimes be desirable to employ clutching members on one side only of the bearing. Moreover, it may be in some instances desirable to use other types of antifriction bearings or bearing types other than antifriction.

The O ring is normally made of rubber and grooved to give a better "spring" effect. Other materials and combinations are conceivable for use in place of the O ring and are within the scope of this invention.

It is clear that the embodiments of the invention described have been selected as examples for purposes of explanation and that many other embodiments are known and may be employed which are within the scope of this invention, which I wish to be limited only by the appended claims.

The invention claimed is:

1. A mechanical coupling comprising: inner and outer coaxial clutch races having opposed cylindrical surfaces; clutching means interposed between said opposed cylindrical surfaces and having arcuately formed opposite edge surfaces biased for continuous contact with said races said arcuate surfaces engaging said opposed cylindrical surfaces in axially spaced planes and being skewed from positions of circumferential alignment with the cylindrical surfaces which they engage to permit relative rotation between said races in one direction and to roll into a jammed condition between said races upon initiation of relative rotation between said races in an opposite direction.

2. A mechanical coupling comprising: a driving member having a cylindrical clutching surface with a cylindrical axis; a driven member having a cylindrical clutching surface of greater diameter than that of said driving member and having a cylindrical axis, said driving and driven member related with their clutching surfaces opposed and coaxial to provide an annular space therebetween; a clutching member disposed in said space and having arcuately formed opposite edge surfaces maintained in contact with each said cylindrical surface in axially spaced planes, said edge surfaces being skewed from circumferential alignment with their associated cylindrical surfaces such that rotational motion of said driving member relative to said driven member in one direction tends to reduce the force of contact, and rotational motion of said driving member relative to said driven member in the opposite direction tends to increase the force of contact, prohibiting further rotational motion and providing positive driving connection to said driven member.

3. A one-way clutch comprising: inner and outer coaxial races relatively rotatable about an axis and having opposed cylindrical surfaces; clutching discs mounted in the space between said opposed cylindrical surfaces, each of said discs having a diametral surface of a single diameter greater than the space between said cylindrical surfaces; guiding means disposed between said races to guide said discs; biasing means constrained with respect to one of said races and disposed in a continuously urging relationship to urge said discs into continuous contact with both of said races with the axes of said discs skewed from coplanar relationship with the axes of said races.

4. A one-way clutch comprising: inner and outer coaxial clutch races supported in fixed axial relationship and relatively rotatable about an axis; clutching discs interposed between said clutch races; spacer means slidingly engaging a portion of at least one of said races to maintain a substantially fixed relationship between said spacer and said race longitudinally of said axis; biasing means having a predetermined location longitudinally of the axis of said one of said races and urging said discs into continuous contact with both said inner and outer race in axially spaced planes, said discs having their axes skewed from coplanar relationship with the axes of said races, whereby rotation of one race with respect to the other in one direction causes said discs to engage in substantially continuous rolling contact with respect to both of said races and the slightest relative rotation of one race with respect to the other race in the opposite direction causes said discs to roll into a jammed condition with respect to said races whereby further relative motion is halted and significant torque transfer between said races is obtainable.

5. The overrunning clutch of claim 1, wherein said clutching means includes packs of separate clutch discs, each separate clutch disc having an outside diameter greater than the radial clearance between said inner and outer clutch races.

6. The overrunning clutch of claim 5, wherein said packs are in spaced relationship around said inner clutch race such that each pack is in slidable engagement with the next preceding and succeeding pack, the slidable engagement between any one pack and the next preceding pack occurring on one side of said one pack and with the next succeeding pack on the opposite side of said one pack.

7. The overrunning clutch of claim 5, wherein said discs have transverse openings therethrough, and wherein said clutching means includes spacer means having a plurality of arms adapted to extend through said openings, and wherein said clutch packs are maintained in spaced relationship about said inner clutch race by said spacer means substantially in rows, the spaced relationship in each row being such that each pack in a row is in slidable engagement with the next preceding pack on one side of said each pack and in slidable engagement with the next succeeding pack on the opposite side of said each pack, and the clutch packs of adjacent rows being in sliding engagement therebetween whereby high torque transmission capacity is attainable in one rotational direction of said clutch.

8. An overrunning clutch comprising: a first member and a second member having coaxial radial bearing means therebetween, said first member having an inner cylindrical clutch race and said second member having an outer cylindrical clutch race; clutching members supported between said clutch races in axially tilted and circumferentially skewed positions, and biasing means maintaining at least a portion of said clutching members in continuous contact with both of said races, each of which members in contact engaging said inner and outer race in separate planes perpendicular to the axes of said races.

9. The overrunning clutch of claim 8, wherein said clutching members are circular discs and each of those in contact with both of said races has one circumferential edge confined in a plane perpendicular to the axis of said races and another circumferential edge substantially confined to another plane perpendicular to the axis of said races, and wherein said separate planes are located between said plane of confinement and said plane of substantial confinement.

10. The overrunning clutch of claim 9, wherein said plane of substantial confinement is defined by said biasing means.

11. An overrunning clutch comprising: a ball bearing having inner and outer coaxial bearing races; bearing balls disposed between said races, a bearing cage maintaining said balls in spaced relationship; a plurality of relatively thin discs having outer diameters greater than the clearance between said races interposed between said bearing races and guidable by said bearing cage; and biasing means to maintain said discs in continuous contact with both of said bearing races with the axes of said discs axially tilted and circumferentially skewed.

12. An overrunning clutch as set forth in claim 11, wherein said discs have transverse openings therein, and appendages affixed to said bearing cage and extending through said transverse openings to maintain said discs in spaced relationship around said bearing races.

References Cited in the file of this patent

UNITED STATES PATENTS

| 1,834,843 | Humfrey | Dec. 1, 1931 |
| 2,079,528 | Richardson | May 4, 1937 |
| 2,113,722 | Dodge | Apr. 12, 1938 |
| 2,307,881 | Dodge | Jan. 12, 1943 |
| 2,412,803 | Dodge | Dec. 17, 1946 |
| 2,904,148 | Schneider et al. | Sept. 15, 1959 |

FOREIGN PATENTS

| 107,422 | Great Britain | June 28, 1917 |
| 617,301 | France | Nov. 19, 1926 |
| 603,357 | Germany | Oct. 2, 1934 |